United States Patent [19]

Gelles

[11] Patent Number: 5,447,775
[45] Date of Patent: Sep. 5, 1995

[54] TORCHABLE ROLL ROOFING COMPOSITION

[75] Inventor: Richard Gelles, Sugarland, Tex.

[73] Assignee: Shell Oil Company, Houston, Tex.

[21] Appl. No.: 200,256

[22] Filed: Feb. 23, 1994

[51] Int. Cl.⁶ .............................................. D06N 7/04
[52] U.S. Cl. ................... 428/141; 428/143;
   428/323; 428/489; 523/351; 524/68; 524/487;
   525/99; 525/105; 525/106; 525/314
[58] Field of Search ............... 428/141, 143, 489, 323;
   524/68, 474, 478, 487; 523/351; 525/99, 105,
   106, 314

[56] References Cited

U.S. PATENT DOCUMENTS

| | | | |
|---|---|---|---|
| 3,917,607 | 11/1975 | Crossland et al. | 524/478 |
| 4,032,491 | 6/1977 | Schoenke | 428/489 X |
| 4,882,384 | 11/1989 | Willis et al. | 525/105 |
| 5,036,119 | 7/1991 | Berggren | 523/351 |
| 5,051,457 | 9/1991 | Gelles | 524/68 |
| 5,308,676 | 5/1994 | Gelles | 428/141 |

FOREIGN PATENT DOCUMENTS 1258209  8/1989  Canada.

*Primary Examiner*—D. S. Nakarani
*Assistant Examiner*—H. Thi Lê
*Attorney, Agent, or Firm*—Donald F. Haas

[57] ABSTRACT

The present invention is a bituminous roofing composition which is especially useful to coat and/or saturate a roll roofing membrane. The composition comprises from 2 to 10 percent by weight, based on block copolymer plus bitumen, of a block copolymer of a vinyl aromatic hydrocarbon and a conjugated diene, from 25 to 300 parts by weight per hundred parts of said block copolymer of an endblock compatible resin which has a softening point above 100° C., and the balance being a bituminous material. Preferably, the solubility parameter of the endblock resin is within 0.3 $[cal/cm^3]^{\frac{1}{2}}$ of that of the vinyl aromatic hydrocarbon portion of the block copolymer.

10 Claims, No Drawings

TORCHABLE ROLL ROOFING COMPOSITION

BACKGROUND OF THE INVENTION

This invention relates to a bituminous roofing composition which comprises a block copolymer and a bituminous material. More particularly, this invention relates to a torchable roll roofing composition comprising the aforementioned ingredients and a third ingredient which assists in enhancing the composition's resistance to heat at roof top temperatures while at the same time enhancing flow at torching temperatures.

Asphalt is a common material utilized for the preparation of roofing members and coatings which may be applied as mopping grade asphalts, cutbacks in solvents, single ply membranes, shingles, roll roofing membranes, etc. While the material is suitable in many respects, it inherently is deficient in some physical properties which it would be highly desirable to improve. Efforts have been made in this direction by addition of certain conjugated diene rubbers, neoprene, resins, fillers and other materials for the modification of one or more of the physical properties of the asphalt binder. Each of these added materials modifies the asphalt in one respect or another but certain deficiencies can be noted in all compounds proposed. For example, some of them have excellent weather resistance, sealing and bonding properties but are often deficient with respect to warm tack, modulus, hardness and other physical properties.

Since the late 1960s, styrene-butadiene rubber and styrene-rubber block copolymers such as styrene-butadiene-styrene and styrene-isoprene-styrene block copolymers have been used to dramatically improve the thermal and mechanical properties of asphalts. Practical application of the rubber addition approach requires that the blended product retain improved properties and homogeneity during transportation, storage and processing. Long term performance of elastomer-modified asphalts also depends on the ability of the blend to maintain thermal and chemical stability.

To be suitable for synthetic roofing materials, the asphalt-block copolymer mixtures should meet the following requirements:
(a) sufficient resistance to flow at high temperatures,
(b) sufficient flexibility at low temperatures,
(c) workability according the convention methods used in the roofing technique,
(d) adequate hot storage stability,
(e) adequate hardness to prevent deformation during walking on the roof, and
(f) if it is to be used as an adhesive, sufficient adhesion.

For roll roofing applications, it is preferred that the softening point (the temperature at which the material will tend to flow) be above about 250° F., the cold bend temperature (the temperature at which the material will crack during application and service), which is not as critical a parameter as the others in this application, should be below about −5° C., and that the asphalt and block copolymer components should be able to be mixed and processed at a temperature no higher than about 200° C. to keep the asphalt heating costs down and to prevent softening of the polyester reinforcement commonly used in these membranes.

For roll roofing membranes, the bituminous composition is used to saturate and/or coat a reinforcing mat. The bitumen is there to make the membrane waterproof. The mat is used to aid in mechanical properties (gives the membrane strength, etc.). Polymer is added to the asphalt to improve the weatherability and mechanical properties of the asphalt.

Resistance to degradation under the application of heat at roof top temperatures is an important consideration in materials for roll roofing membranes. Roll roofing membranes are used, for example, to protect the surface of a roof. The membrane is rolled up and when applied, is merely unrolled in place on the roof. One application method to secure the membrane to the roof is torching, i.e. heating with a flame at a high temperature, perhaps close to 2000° C. High performance roll roofing membranes which comprise a reinforcing mat coated with block copolymer modified asphalt must use a bituminous composition which flows sufficiently at these temperatures to ensure good application to the roof.

One method which has been used to increase the resistance of such compositions to heat at roof top temperatures and enhance flow at torching temperatures is to add an amount of atactic polypropylene to the bitumen/polymer blend. Membranes using such compositions are relatively easy to apply by torching because the atactic polypropylene has a sharp transition at its melting point and becomes a low viscosity material immediately. Thus, it is much easier to determine the point at which the torching should be discontinued than it is for materials like the block copolymers of the present invention which do not possess a sharp melting point.

Atactic polypropylene blends have the above advantages and are relatively low cost because they are easy to apply with relatively inexpensive equipment. However, they have the disadvantage that they are not elastic. This gives membranes made with such compositions a shorter life span because cracks form much more easily and are damaging to the surface because of the inelasticity of the composition.

Thus, it can be seen that it would be highly advantageous to be able to produce a bitumen/polymer blend for roll roofing which can be applied using relatively inexpensive equipment (flow characteristics) but which is also elastic. The present invention provides such a composition.

SUMMARY OF THE INVENTION

The present invention provides a bituminous roofing composition which comprises from 2 to 10 percent by weight, based on block copolymer plus bitumen, of a block copolymer of a vinyl aromatic hydrocarbon and a conjugated diene, from 25 to 300 parts per hundred parts by weight of said block copolymer of an endblock compatible resin which has a softening point above 100° C., and the balance being a bituminous material. The composition may contain from 0 to 65 percent by weight of a filler based on the total composition. It is highly preferred that the solubility parameter of the endblock resin be within 0.3 $[cal/cm^3]^{\frac{1}{2}}$ of that of the vinyl aromatic hydrocarbon portion of the block copolymer. When the vinyl aromatic hydrocarbon is styrene, the solubility parameter of the endblock resin should range from 8.8 to 9.4 $[cal/cm^3]^{\frac{1}{2}}$. The present invention also comprises a torchable roll roofing membrane which comprises a reinforcing mat and the above described bituminous composition which saturates and/or coats the reinforcing mat.

DETAILED DESCRIPTION OF THE INVENTION

The basic part or framework of a roll roofing membrane is the reinforcing mat. The reinforcing mat is made of a material which is capable of being saturated and/or coated with bituminous compositions which can be polymer modified asphalt or some other material such as unmodified asphalt. Such materials include fibrous materials including glass and polyester fibers. The roll roofing membrane may or may not be topped with granules. In order to make the roll roofing membrane of the present invention, a layer of a bituminous composition is coated onto at least one surface of the membrane to form a protective layer. It may or may not saturate the membrane. This is generally the surface which will be exposed to the heat when the roll roofing membrane is torched as it is applied on the surface of a roof. A plastic cover sheet may be placed over the top of the layer to prevent the membrane from adhering to itself. The plastic sheet generally burns off during torching. This sheet may be perforated in order to allow bitumen on the roof to bond with bitumen on or in the membrane if the roll roofing membrane is attached to the roof by means other than torching, e.g., by mopping asphalt or solvent-based asphalt cut back adhesive.

The bituminous roofing composition of the present invention, while it is described herein in terms of its use with a roll roofing membrane, may also be used to advantage as a mopping bitumen composition. A mopping bitumen composition is one which is applied to the surface of a roof by mopping or other similar means. The composition of the present invention may also be used as a cold applied adhesive. Cold applied adhesives are used in repair work and in cases in which it is dangerous to use an open flame or difficult to supply hot asphalt; for example, a roof on a city skyscraper.

The bituminous component in the bituminous block copolymer compositions according to the present invention may be a naturally occurring bitumen or derived from a mineral oil. Also petroleum derivatives obtained by a cracking process and cold tar can be used as the bituminous component as well as blends of various bituminous materials.

Examples of suitable components include distillation or "straight-run bitumens," precipitation bitumens, e.g. propane bitumens, blown bitumens and mixtures thereof. Other suitable bituminous components include mixtures of one or more of these bitumens with extenders such as petroleum extracts, e.g. aromatic extracts, distillates or residues. Suitable bituminous components (either "straight-run bitumens" or "fluxed bitumens) include those having a penetration of less than about 150 (decimillimeters) at 25° C. This limitation excludes many of the softer bituminous components such as pure fluxes and pure aromatic extracts which are too soft for this application. In addition, their use requires high levels of high molecular weight block copolymer to meet softening point requirements, which makes it more difficult to torch. However, softer asphalts can be used when a filler is used because the filler makes the composition harder and less tacky.

The amount of block copolymer component used in the compositions for saturating and/or coating the reinforcing mat range generally from 2 to 10 percent by weight, preferably from 3 to 8 percent, based on block copolymer and bitumen. Negatives at higher polymer loadings include difficulties in torching due to high viscosities. Too little polymer results in an inelastic composition.

The block copolymer components of the compositions saturating and/or coating the reinforcing mat are block copolymers of a vinyl aromatic hydrocarbon such as styrene and a conjugated diene such as butadiene or isoprene. Such elastomeric block copolymers can have general formulas A-B-A or $(AB)_nX$ wherein each A block is a vinyl aromatic hydrocarbon polymer block, each B block is a conjugated diene polymer block, X is a coupling agent, and n is an integer from 2 to 30. Such block copolymers may be linear or may have a radial or star configuration as well as being tapered. Block copolymers such as these are well known and are described in many patents including U.S. Pat. Nos. 4,145,298, 4,238,202 and Reissue 27,145 which describes hydrogenated block copolymers. These patents are herein incorporated by reference. The description of the type of polymers, the method of manufacturing the polymers and the method of hydrogenation of the polymers is described therein and is applicable to the production of block copolymers containing other vinyl aromatic hydrocarbons such as alpha methyl styrene and other conjugated dienes or mixtures of conjugated dienes.

The molecular weights of the block copolymers used in the present invention may vary over a wide range. However, it is preferable that the contour arm molecular weight of the block copolymers range from about 30,000 to about 300,000. At lower molecular weights, they must be added at high concentrations and at higher molecular weights, they are expensive and give compositions that are difficult to process. These molecular weights are determined by gel permeation chromatography as described below.

The molecular weight ranges referred to herein are the contour arm molecular weights. Radial and star polymers have much higher total molecular weight than linear polymers do but the mechanical properties considered herein are dependent not upon the total molecular weight in the case of radial and star polymers but rather on the molecular weight of the contour arms of those polymers. For a linear A-B-A polymer, the contour molecular weight is the same as the total molecular weight and the molecular weight range of the present invention is 30,000 to 300,000 for linear polymers. For three arm radial polymers, one must multiply the contour arm molecular weight by 1.5 to obtain the total molecular weight. Thus, the total molecular weight range for a three arm polymer of the present invention would be 45,000 to 450,000. For a four arm radial polymer, the range would be two times the contour molecular weight range or 60,000 to 600,000. In general, for a coupled radial or star polymer $(AB)_nX$, the contour molecular weight is the molecular weight along the contour of the molecule, which is $(AB)_2$. Thus, for a coupled radial or star polymer $(AB)_nX$, the total molecular weight range is n/2 times the contour molecular weight range.

Molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For polymers of the type described herein, the appropriate standard is a narrow molecular weight polystyrene standard. For anionically polymerized linear polymers, the polymer is essentially monodisperse and it is both convenient and adequately descriptive to report the "peak" molecular weight of the narrow molecular weight distribution observed. The peak molecular weight is usually the molecular weight of the main species shown on the chromatograph. For materials to be used in the columns of the GPC, styrene-divinyl benzene gels or silica gels are commonly used and are excellent materials. Tetrahydrofuran is an excellent solvent for polymers of the type described herein. Ultraviolet or refractive index detectors may be used.

Measurement of the true molecular weight of a coupled star polymer is not as straightforward or as easy to make using GPC. This is because the star shaped molecules do not separate and elute through the packed GPC columns in the same manner as do the linear polymers used for the calibration. Hence, the time of arrival at an ultraviolet or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pour sized directly into the light scattering cell. The light scattering measurements are performed as a function of scattering angle, polymer concentration and polymer size using standard procedures. The differential refractive index (DRI) of the sample is measured at the same wave length and in the same solvent used for the light scattering. The following references are herein incorporated by reference:

1. *Modem Size-Exclusion Liquid Chromatography*, M. W. Yau, J. J. Kirkland, D. D. Bly, John Wiley and Sons, New York, N.Y., 1979.
2. *Light Scattering From Polymer Solutions*, M. B. Huglin, ed., Academic Press, New York, N.Y., 1972.
3. W. K. Kai and A. J. Havlik, *Applied Optics*, 12, 541 (1973).
4. M. L. McConnell, *American Laboratory*, 63, May, 1978.

In order to be effective in the present application, the block polymers generally have a vinyl aromatic hydrocarbon (usually polystyrene) content ranging from 15 percent to 45 percent by weight. If the polystyrene content is lower than 15 percent, the physical properties are decreased and the molecular weight of the polymer would have to be much higher to get the proper physical properties and increasing the molecular weight may cause mixing problems. It also increases the cost of the polymer. If the polystyrene content is above 45 percent, the bituminous component and the block polymer component are generally too hard to mix. The elastomeric properties tend to decrease because of the presence of a continuous styrene phase in the polymer.

The endblock compatible resin is a resin which is compatible with the polymer block which is normally on the end of the block copolymers of the present invention, i.e., the vinyl aromatic hydrocarbon block. Such endblock compatible resins are often used as reinforcing agents in adhesives. These resins should have a softening point above 100° C. to increase the slump resistance of the composition. Useful resins include coumarone-indene resins, poly alpha methyl styrene, polystyrene resins, vinyl toluene-α-methyl styrene copolymers and polyindene resins.

Examples of aromatic resins useful in the composition of the present invention are AMOCO ® 18 series resins, which are composed of alpha methyl styrene (Amoco), Kristalex ® series resins, which are composed of alpha methyl styrene (Hercules), PICCOTEX ® Series resins, which are composed of alpha methyl styrene and vinyl toluene (Hercules), NEVCHEM ® (Neville) and PICCO 6000 (Hercules) series resins, which are composed of aromatic hydrocarbons, CUMAR ® series resins and CUMAR LX-509 (Neville), which are composed of coumarone-indene, PICCOVAR ® AP series resins (Hercules), which are composed of alkyl aryl species, PICCOVAR ® 130 (Hercules), which is an alkyl aromatic poly indene resin, and ENDEX ® 155 (Hercules), a resin derived by copolymerization of pure aromatic monomers.

The endblock resin is generally an aromatic resin. Some endblock resins will be more compatible with one type of asphalt whereas other endblock resins will be more compatible with a different type of asphalt. Further, different endblock resins are more or less compatible with different vinyl aromatic hydrocarbons. It is important that the solubility parameter of the endblock resin be as close as possible to that of the vinyl aromatic hydrocarbon block in the block copolymer to ensure their compatibility. Generally, the solubility parameter should be within 0.3 $[cal/cm^3]^{\frac{1}{2}}$ of the solubility parameter of the vinyl aromatic hydrocarbon block. In the case of polystyrene, which has a solubility parameter of 9.1, the solubility parameter of the endblock resin should range from 8.8 to 9.4.

Hildebrand's solubility parameter is a measure of the total forces holding the molecules of a solid or a liquid together. It has the units of $(cal/cm^3)^{\frac{1}{2}}$. Every compound is characterized by a specific value of solubility parameter, although this value may not always be recorded in convenient literature references. Materials having the same solubility parameter tend to be miscible. Those with different solubility parameters tend to be immiscible. Discussions of solubility parameter concepts are presented in (1) *Encyclopedia of Polymer Science and Technology*, Interscience, New York (1965), Vol. 3, page 833; and (2) *Encyclopedia of Chemical Technology*, Interscience, New York (1971), Supplement Volume, page 889 which are herein incorporated by reference.

As stated above, the endblock resin may be used in an amount from 25 to 300 parts by weight per hundred parts of the block copolymer. If less than 25 parts are used, then a large increase in slump resistance is not observed. If more than 300 parts are used, then an inelastic hard phase continuous composition is obtained. The preferred range of use for the endblock resin is from 30 to 100 parts per 100 parts of the block copolymer because this combines adequate slump resistance at lower block copolymer contents (easier torching) with elasticity.

The compositions of the present invention may contain other materials such as fillers including calcium carbonate, limestone, chalk, ground rubber tires, etc. If other materials are added, the relative amounts of the bitumen and polymer specified above remain the same. The filler is generally used in an amount from 0 to 65 percent by weight based on the total composition. The filler is used to harden or stiffen the composition and to decrease its cost. Preferably, the amount of filler to be used in the composition of the present invention is from 1 to 50 percent by weight because it is easier to process and the membrane rolls are not too heavy.

The bituminous block copolymer compositions of the present invention may be prepared by various methods. A convenient method comprises blending of the two components at an elevated temperature, preferably not more than about 250° C. to keep the asphalt heating costs down. Other methods for preparing the composition of the present invention include precipitation of drying of the components from a common solvent and emulsifying the polymer with an asphalt emulsion.

EXAMPLE

The endblock resins are Kristalex ® 1120 and Piccotex ® 120 resins which have a solubility parameter of about 9.0. They are alpha methyl styrene polymers and alpha methyl styrene/vinyl toluene copolymers, respectively, made by Hercules. They are endblock resins because of their compatibility with styrene. The asphalt is WRAC-10 made by Shell Oil Company at its Wood River refinery. The polymer is KRATON ® D-1101 rubber, a linear styrene-butadiene-styrene block copolymer made by Shell Oil Company having a molecular weight of 111,000. Blends are prepared by mixing all ingredients together in a laboratory Silverson high shear mixer at 180° C. The blends are made over the following compositions:

- —2, 3, 8, and 10 percent by weight D-1101 based on asphalt plus polymer.
- —25, 30, 100, and 300 parts by weight of resin to 100 parts polymer.

Compared to blends made with the polymer alone these blends exhibit a better balance of slump and torchability. In other words, at equivalent slump resistance (as measured by ring and ball softening point), the blends described here flow faster when exposed to a hand-held propane torch than blends with the polymer alone.

I claim:

1. A bituminous roofing composition which comprises:

(a) from 2 to 10 percent by weight, based on block copolymer plus bituminous material, of a block copolymer of a vinyl aromatic hydrocarbon and a conjugated diene having a vinyl aromatic hydrocarbon content of 15 to 45 percent by weight, (b) from 25 to 300 parts by weight per hundred parts of said copolymer of an endblock compatible resin which has a softening point above 100° C. and a solubility parameter within 0.3 $[cal/cm^3]^{\frac{1}{2}}$ of that of the vinyl aromatic hydrocarbon portion of the block copolymer, and (c) the balance being a bituminous material; wherein the composition also comprises from 0 to 65 percent by weight of a filler based on total composition.

2. The composition of claim 1 wherein the vinyl aromatic hydrocarbon is styrene and the solubility parameter of the endblock compatible resin ranges from 8.8 to 9.4 $[cal/cm^3]^{\frac{1}{2}}$.

3. The composition of claim 1 wherein the amount of the block copolymer ranges from 3 to 8 percent.

4. The composition of claim 1 wherein the amount of the filler ranges from 1 to 50 percent.

5. The composition of claim 1 wherein the amount of the endblock resin ranges from 30 to 100 parts per hundred parts of the block copolymer.

6. A torchable roll roofing membrane which comprises:

(a) a reinforcing mat, and (b) the bituminous composition of claim 1 which saturates and/or coats the reinforcing mat.

7. The membrane of claim 6 wherein the vinyl aromatic hydrocarbon is styrene and the solubility parameter of the endblock compatible resin ranges from 8.8 to 9.4 $[cal/cm^3]^{\frac{1}{2}}$.

8. The membrane of claim 6 wherein the amount of the block copolymer ranges from 3 to 8 percent.

9. The membrane of claim 6 wherein the amount of the filler ranges from 1 to 50 percent.

10. The membrane of claim 6 wherein the amount of the endblock resin ranges from 30 to 100 parts per hundred parts of the block copolymer.

* * * * *